United States Patent
Becker et al.

(10) Patent No.: US 11,200,195 B2
(45) Date of Patent: Dec. 14, 2021

(54) METHOD AND DEVICE FOR THE INITIAL PROGRAMMING OF A SECONDARY COMPUTER

(71) Applicant: Robert Bosch GmbH, Stuttgart (DE)

(72) Inventors: Eugen Becker, Ludwigsburg (DE); Matthias Schreiber, Vaihngen/Enz (DE); Axel Aue, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/631,975

(22) PCT Filed: Jun. 11, 2018

(86) PCT No.: PCT/EP2018/065294
§ 371 (c)(1),
(2) Date: Mar. 20, 2020

(87) PCT Pub. No.: WO2019/015872
PCT Pub. Date: Jan. 24, 2019

(65) Prior Publication Data
US 2020/0226092 A1 Jul. 16, 2020

(30) Foreign Application Priority Data
Jul. 18, 2017 (DE) .......................... 102017212252.8

(51) Int. Cl.
*G06F 13/42* (2006.01)
*G06F 13/12* (2006.01)
(Continued)

(52) U.S. Cl.
CPC ...... *G06F 13/4291* (2013.01); *G06F 9/44505* (2013.01); *G06F 13/126* (2013.01); *G06F 13/28* (2013.01)

(58) Field of Classification Search
None
See application file for complete search history.

(56) References Cited

U.S. PATENT DOCUMENTS 5,781,774 A * 7/1998 Krick ................... G06F 13/4072
713/1
5,805,882 A * 9/1998 Cooper ............... G06F 11/1433
711/166

(Continued)

FOREIGN PATENT DOCUMENTS

DE 102007051657 A1 4/2009
EP 3043262 A1 7/2016
(Continued)

OTHER PUBLICATIONS

International Search Report for PCT/EP2018/065294, dated Aug. 21, 2018.
(Continued)

*Primary Examiner* — Henry Tsai
*Assistant Examiner* — Christopher A Bartels
(74) *Attorney, Agent, or Firm* — Norton Rose Fulbright US LLP; Gerard Messina

(57) ABSTRACT

A method for the initial programming of a secondary computer. The method includes configuring a serial interprocessor interface between the secondary computer and a main computer, and data are written via the interface to a flash memory of the secondary computer.

9 Claims, 1 Drawing Sheet

(51) Int. Cl.
*G06F 9/445* (2018.01)
*G06F 13/28* (2006.01)

(56) References Cited

U.S. PATENT DOCUMENTS

| | | | |
|---|---|---|---|
| 10,024,921 B2* | 7/2018 | Butzmann | B60L 58/21 |
| 10,572,242 B1* | 2/2020 | Santharam | G06F 11/1004 |
| 2004/0225418 A1* | 11/2004 | Barrenscheen | H04L 1/24 |
| | | | 701/1 |
| 2004/0232449 A1* | 11/2004 | Barrenscheen | G05B 9/02 |
| | | | 257/203 |
| 2005/0120343 A1 | 6/2005 | Tai et al. | |
| 2005/1203430 | 6/2005 | Horng-Ming | |
| 2005/0273601 A1* | 12/2005 | Buch | G06F 9/5027 |
| | | | 713/161 |
| 2006/0277346 A1* | 12/2006 | Doak | H04L 12/5692 |
| | | | 710/305 |
| 2008/0034151 A1 | 2/2008 | Lu et al. | |
| 2008/0341510 | 2/2008 | Chi-Chang | |
| 2012/0096451 A1* | 4/2012 | Tenbarge | G06F 11/1433 |
| | | | 717/170 |
| 2013/0346756 A1* | 12/2013 | Cook | G06F 21/57 |
| | | | 713/189 |
| 2013/0346814 A1* | 12/2013 | Zadigian | H04L 43/50 |
| | | | 714/724 |
| 2017/0213034 A1* | 7/2017 | Sarangdhar | G06F 11/1417 |
| 2020/0210205 A1* | 7/2020 | Govindarajan | H04L 49/351 |

FOREIGN PATENT DOCUMENTS

| | | |
|---|---|---|
| JP | 2003123475 A | 4/2003 |
| JP | 2005122759 A | 5/2005 |
| JP | 2008102668 A | 5/2008 |
| JP | 2011113240 A | 6/2011 |
| JP | 2014066854 A | 4/2014 |
| JP | 2016103114 A | 6/2016 |

OTHER PUBLICATIONS

Dees, et al.: "Introduction to the Zipwire Interface; Inter-Processor Communication with SIPI/LFAST on the MPC57xx and S32Vxxx families", May 2015, NXP Freescale Semiconductor Application Note, Doc. No. AN5134, XP055795154, pp. 1-38.

* cited by examiner

METHOD AND DEVICE FOR THE INITIAL PROGRAMMING OF A SECONDARY COMPUTER

FIELD

The present invention relates to a method for the initial programming of a secondary computer. In addition, the present invention relates to a corresponding device, a corresponding computer program, and a corresponding storage medium.

BACKGROUND INFORMATION

In digital and automation technology, any semiconductor module that contains a processor and peripheral functions is referred to as a microcontroller (pController, pC, MCU). Microcontrollers known in the existing art sometimes have flash electrically erasable programmable read-only memories, or flash EEPROMs. In addition, control devices (electronic control units, or ECUs) are known that have a plurality of microcontrollers configured as master computers and slave computers.

German Patent Application No. DE10,2007/051657A1 provides a communication system and a method for operating a communication system, the communication system having a CAN bus and at least two devices coupled via the CAN bus. Such a device has a CAN control unit, an asynchronous, serial communication interface unit, and a switching means. The CAN control unit is suitable for transmitting, in a first transmission mode, CAN data frames via the CAN bus, using a first physical protocol. The asynchronous, serial communication interface unit is suitable for transmitting ASC data frames via the CAN bus, using a second physical protocol, in a second transmission mode. The switching means is set up to change over between the first transmission mode and the second transmission mode as a function of at least one agreement made between the device and at least one additional device.

SUMMARY

The present invention provides an example method for the initial programming of a secondary computer, a corresponding example device, a corresponding example computer program, and a corresponding example storage medium.

In accordance with the present invention, it is recognized that during the booting of a microcontroller in its state as delivered ("virgin device"), the boot loader normally checks a defined address in the flash to find out whether a valid program start address is present. If there is no valid entry, the boot loader receives an asynchronous serial communication (ASC) via CAN or UART in order to receive data via the CAN interface according to the ASC protocol (ASC@CAN). The received data are then programmed to the flash memory.

In addition, the present invention recognizes that in control devices having inadequate performance of one microcontroller, designs are frequently used that have two microcontrollers in a master-slave configuration. In this case, the second pC, configured as slave, can be used as a peripheral expansion, e.g. for inadequate ADC channels, more CAN interfaces, etc. However, the slave can also execute separate programs, and can operate separate connected peripheral modules. The results are then provided to the master, or read out by the master itself. In addition, the slave can be realized as a pluggable board in order to represent different performance classes within a hardware family of control devices, or to offer particular additional features as added value. The two pC are connected via a powerful serial interprocessor interface (SIPI) so that the exchange of data can take place with adequate performance.

A particular feature of this interface is that the master can have write access or read access to every address in the slave as long as no address protection mechanisms are activated. Due to the high transmission speed, the transmit and receive ports are typically set up for the transmission of a low-voltage differential signal (LVDS) in the sense of the standard ANSI/TIA/EIA-644-1995, in order to meet EMC requirements.

According to an example embodiment of the present invention, a new boot mode via the SIP interface is provided. The selection of the boot mode between CAN/UART or SIPI takes place using conventional methods, e.g., with HW configuration spins. During the boot process, the new boot mode is recognized. In order to set up the SIPI function, the pins should be configured to LVDS, and a minimal initialization of the SIPI module (PLL, transmitter, receiver, etc.) should be carried out. The further controlling is later taken over by the master.

An advantage of this solution is the possibility it provides for direct programming of the slave by the master, using the already-connected SIPI interface.

In this way, specific additional hardware, such as a CAN transceiver, for the programming of the slave pC can be done without. As a result, the costs that would arise only for the factory programming of the secondary computer are then not incurred.

Moreover, additional programming points for a needle adapter are no longer necessary. As a result, open spaces on the circuit board can be opened up. The space that thus becomes available can be used to unbundle other circuits. Additional pins for the slave programming at the pC, as used for example in the so-called "ASC@CAN" method via UART, can be done without, because signal conductors that are generally already present are used.

A further advantage results for the production facility, because no special equipment (e.g., a second programming station) is required for the slave programming.

Through the measures described herein, advantageous developments and improvements of the basic present invention are possible.

BRIEF DESCRIPTION OF THE DRAWINGS

Exemplary embodiments of the present invention are shown in the figures and are explained in more detail in the following description.

DETAILED DESCRIPTION OF EXAMPLE EMBODIMENTS

Figure 1:
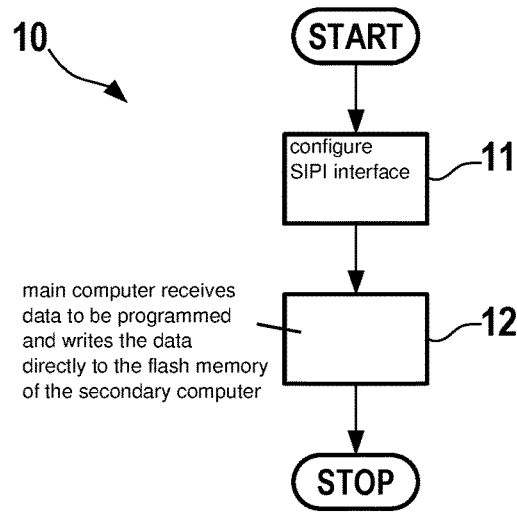
FIG. 1 shows the flow diagram of a method according to a first specific embodiment.
Figure 2:
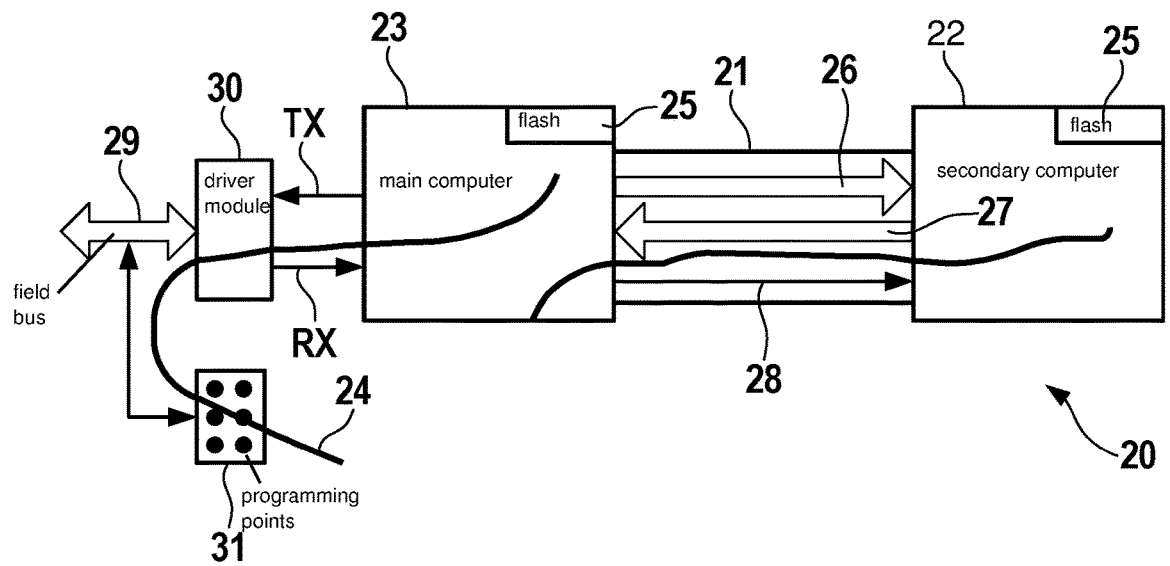
FIG. 2 schematically shows a control device according to a second specific embodiment.

FIG. 1 shows the basic sequence of a method (10) according to the present invention, whose steps are explained in more detail below on the basis of the control device (20) according to FIG. 2.

During the boot process of the secondary computer (22), the boot loader checks a defined address of its flash memory (25) for the presence of a valid program start address. If no valid entry is found, the boot loader recognizes the SIPI boot mode via the pre-configuration—e.g., external hardware configuration spins—and waits for the data (24) that are to be programmed. So that a reception of data can take place, the SIPI interface (21) is first configured (process 11—FIG. 1) during the booting to such an extent that a communication with the main computer (23) can be ensured. For SIPI operation, this includes in particular the initialization of corresponding ports as LVDS input (26), LVDS output (27), and system clock (28). The latter is used either as input clock for the slave SIPI PLL or, instead of a quartz crystal, as input clock for the complete secondary computer (22). In the second case, the clock for the slave SIPI PLL is derived from the system PLL of the secondary computer (22).

The further programming (process 12—FIG. 1) of the secondary computer (22) can take place in various ways. For example, the main computer (23) receives the data (24) to be programmed from a programming station, and writes the data directly to the flash memory (25) of the secondary computer (22).

According to an alternative specific embodiment, the main computer (23) first loads a program via the SIPI interface (21) into the RAM of the secondary computer (22). This program is executed, and takes over the programming of the flash memory (25). The programming data (24) are communicated from the programming station to the secondary computer (22) via the main computer (23) and the SIPI interface (21).

The specific software implementation is a function of the programming design, and may be varied without departing from the scope of the present invention.

What is claimed is:

1. A method for an initial programming, by a main computer of a system, of a secondary computer of the system that is a slave of the main computer, the secondary computer being configured to execute processes that produce results that the secondary computer provides to the main computer or to which the main computer has access via a serial interprocessor interface (SIPI), the initial programming being with specified data, the method comprising the following steps:
   during a booting of the secondary computer in a first boot mode, a boot loader of the system determining whether a flash memory of the secondary computer includes a valid program start address; and
   responsive to a result of the determination being that the valid program start address is not recognized in the flash memory of the secondary computer:
      changing the booting to a second boot mode of the system that uses the SIPI between the secondary computer and the main computer; and
      in the second boot mode, the main computer controlling a writing of the data, via the SIPI, to the flash memory of the secondary computer so that the flash memory thereby includes the valid program start address for a subsequent booting of the secondary computer.

2. The method as recited in claim 1, wherein the changing of the booting to the second boot mode includes configuring a low-voltage differential signal (LVDS) output, an LVDS input, and a system clock of the SIPI.

3. The method as recited in claim 1, wherein before the writing, the data are communicated to the main computer via a field bus.

4. The method as recited in claim 3, wherein the communication takes place through a driver module for the field bus, having a transmitter and a receiver.

5. The method as recited in claim 1, wherein the data are communicated via programming points on a circuit board that is common to the secondary computer and the main computer.

6. The method as recited in claim 1, wherein the main computer receives the data from a programming station, and the writing is performed by the main computer.

7. The method as recited in claim 1, wherein, via the SIPI, the main computer loads a program to a direct access memory of the secondary computer and communicates the data to the secondary computer, and wherein the writing is performed by the program.

8. A non-transitory machine-readable storage medium on which is stored a computer program for an initial programming, by a main computer of a system, of a secondary computer of the system that is a slave of the main computer, the secondary computer being configured to execute processes that produce results that the secondary computer provides to the main computer or to which the main computer has access via a serial interprocessor interface (SIPI), the initial programming being with specified data, the computer program, when executed by the system, causing the system to perform the following steps:
   during a booting of the secondary computer in a first boot mode, a boot loader of the system determining whether a flash memory of the secondary computer includes a valid program start address; and
   responsive to a result of the determination being that the valid program start address is not recognized in the flash memory of the secondary computer:
      changing the booting to a second boot mode of the system that uses the SIPI between the secondary computer and the main computer; and
      in the second boot mode, the main computer controlling a writing of the data, via the SIPI, to the flash memory of the secondary computer so that the flash memory thereby includes the valid program start address for a subsequent booting of the secondary computer.

9. A system comprising:
a main computer;
a serial interprocessor interface (SIPI); and
a secondary computer;
wherein:
   the secondary computer is configured to execute processes that produce results that the secondary computer is configured to provide to the main computer or to which the main computer has access via the SIPI; and
   the system is configured to perform a method for an initial programming of the secondary computer with specified data, the method comprising:
      during a booting of the secondary computer in a first boot mode, a boot loader of the system determining whether a flash memory of the secondary computer includes a valid program start address; and
      responsive to a result of the determination being that the valid program start address is not recognized in the flash memory of the secondary computer:
         changing the booting to a second boot mode of the system that uses the SIPI between the secondary computer and the main computer; and
         in the second boot mode, the main computer controlling a writing of the data, via the SIPI, to the flash memory of the secondary computer so that the flash memory thereby includes the valid program start address for a subsequent booting of the secondary computer.

* * * * *